United States Patent Office 2,788,814
Patented Apr. 16, 1957

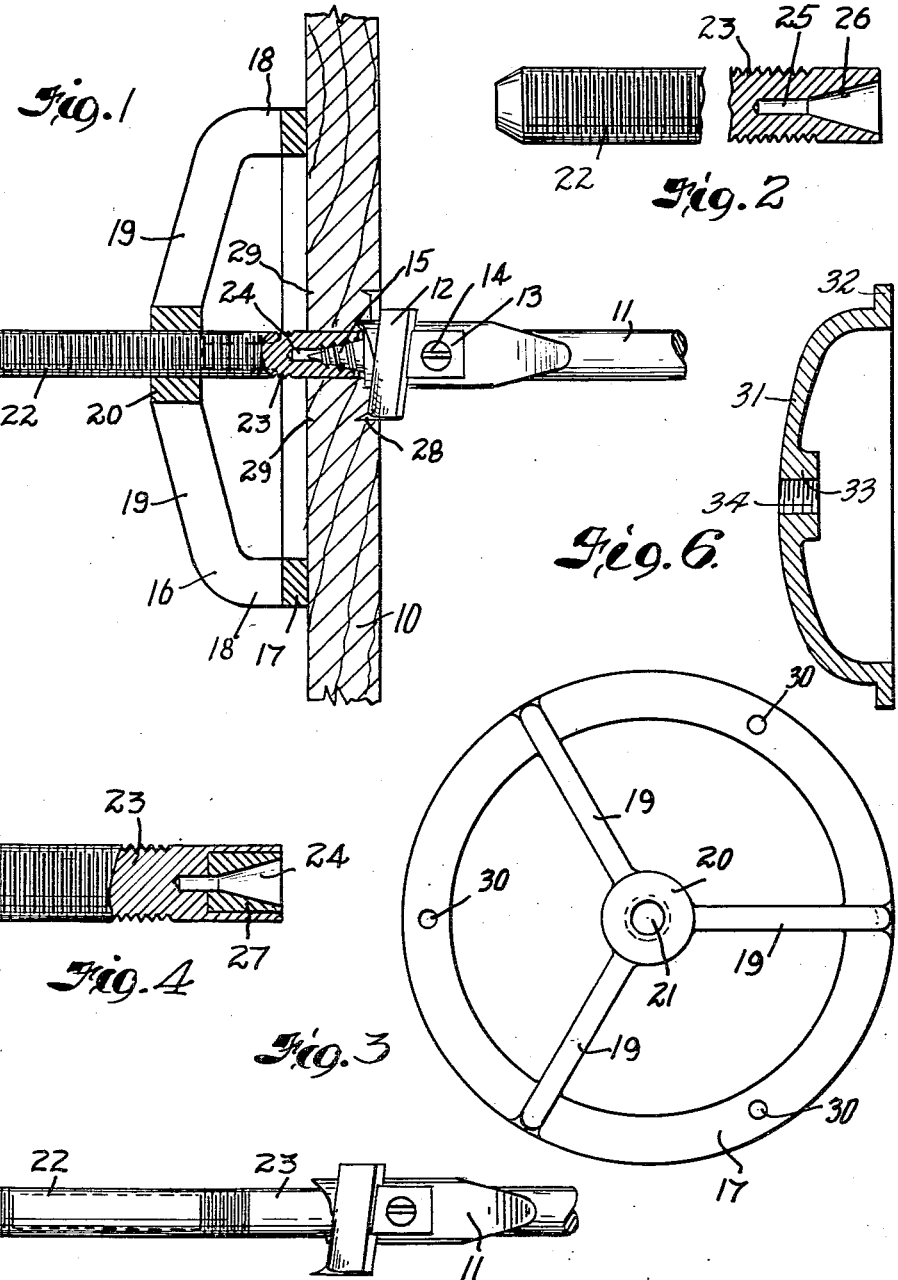

2,788,814

DRILL GUIDING AND FEEDING MEANS

Lewis F. R. Bellows, Fort Lauderdale, Fla.

Application August 22, 1955, Serial No. 529,620

7 Claims. (Cl. 145—1)

This invention relates to rotary cutting tools and more specifically to means for guiding and feeding them into the pieces of material in which holes are to be bored.

When a drill is employed which comprises cutting edges which are not located symmetrically about the axis of rotation of the drill, the eccentric forces on the drill often cause it to jump damaging the walls of the holes it drills. For this reason, most drills having asymmetric cutting edges thereon are provided with an auxiliary drill or screw brad which precedes the asymmetric cutting edges into the piece of material to be drilled and stabilizes the cutting edges while the hole is being drilled. These screw brads and auxiliary drills are effective in guiding the asymmetric cutting edges when blind holes are being drilled, but when a hole is being drilled entirely through a workpiece, the screw brad or auxiliary drill emerges from the workpiece before asymmetric cutting edges do and hence loses its effectiveness as a stabilizer.

Furthermore, the eccentric forces to which the asymmetric cutting edges are subjected are directly proportional to the axial rate at which the drill is forced into the workpiece. When the drill is forced into the workpiece very rapidly, it is more apt to jump and damage the walls of the hole then it is when driven into the workpiece more slowly at the same rate of rotation. The threads on the screw brad usually provided on such drills are generally effective to feed the drill into the workpiece uniformly, but when the drill is used to bore a hole through a workpiece, the screw brad emerges from the workpiece before the cutting edges do so that just before the drill completes the hole, the screw brad becomes ineffective to feed the cutting edges into the work.

It is, therefore, the principal object of this invention to provide means for guiding the cutting edges of drills through pieces of material to be drilled.

It is a further object of this invention to provide means for uniformly feeding the cutting edges of drills into pieces of material to be drilled.

It is a more particular object of this invention to provide means for stabilizing drills as their cutting edges emerge from the workpiece.

Other objects and advantages of the present invention will become apparent as the following description proceeds.

To the accomplishment of the foregoing and related ends, the invention, then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In the annexed drawing:

Fig. 1 is a side elevation partially in section of one form of my invention;

Fig. 2 is an enlarged view partially in section of the pilot bar illustrated in Fig. 1;

Fig. 3 is a plan view of the spider illustrated in Fig. 1;

Fig. 4 is a side view partially in section of an alternative form of the apparatus illustrated in Fig. 2;

Fig. 5 is a side view of an alternative form of my invention; and

Fig. 6 is a side elevational view in cross-section of an alternative form of the spider forming a part of my invention.

Broadly stated, my invention comprises a drill guiding and feeding means comprising in combination a spider member provided with a peripheral portion having a work engaging face and a substantially central hub spaced from the plane of said work engaging face, said hub provided with a threaded aperture therethrough the axis of which is at right angles to said plane, and a pilot and lead bar comprising a substantially cylindrical body threaded throughout a portion of its length and in such portion adapted to be embraced in the threaded aperture in said hub, the end of said body provided the means adapted to receive and secure against at least one direction of rotation an axially aligned portion of a drill.

With reference now to the annexed drawings and in particular to Figs. 1 through 3, 10 designates a piece of material through which a hole is to be drilled, and 11 designates the shank of a conventional expansive bit with which the hole is to be bored. Provided on the expansive bit 11 is an adjustable cutting edge 12 held onto the bit 11 by a clamp 13 and a screw 14. Extending axially from the bit 11 is a screw brad 15. The means of my invention by which the bit 11 is guided and fed into the workpiece during drilling comprise a spider indicated generally at 16 in Fig. 1 and illustrated in greater detail in Fig. 3. The spider 16 comprises a circular ring 17 having extending axially therefrom three portions 18 which, at their ends remote from the ring 17, are connected by portions 19 to a hub 20 which contains a threaded passageway 21 therethrough which is coaxial with the ring 17.

It should be noted that it is necessary that the portions 18 have a substantial length for reasons enumerated later. It should also be noted that the spider 16 may be constructed as a cup wherein a cylindrical wall replaces the portion 18 illustrated above and a disc replaces the portion 19. Mounted in the threaded passageway 21 is a threaded pilot bar 22 which extends through a previously-formed hole in the workpiece 10. The end 23 of the bar 22 which is on the side of the hub 20 adjacent the plane of the ring 17 is provided with a recess 24 therein; the recess 24 is formed by boring a cylindrical hole 25 therein and enlarging the mouth of the hole 25 so that a portion 26 of the surface of the recess 24 conforms to the shape of a cone with the same cone angle as has the conical screw brad 15 on the drill tool. The material forming the walls of the recess 24 should be a soft metal such as brass or Babbitt metal so that the threads on the screw brad 15 can cut into the walls of the recess 24. If at the time the bar 22 is made the shape of the screw brad on the particular drill with which my invention is to be used is known, the wall of recess 24 may be threaded to receive such a brad; in this case use of a soft metal as the wall of the recess 24 is unnecessary, and the entire bar 22 may be made of steel.

When it is desirable to construct the threaded portion of the bar 22 out of steel and it is impractical to thread the recess 24, the bar may be provided with a cylindrical hole in the end thereof and a piece 27 of soft material, such as brass or Babbitt material, containing the recess 24 may be rigidly mounted therein as is illustrated in Fig. 4.

In the alternative form of my invention illustrated in Fig. 5, the end 23 of the bar 22 is fixedly connected with the end of the drill 11. Such connection may be by way of a welded joint, or the bar 22 may be an extension of the body 11 of the drill formed integrally therewith when the drill is made.

When my invention is used to drill a large hole through a workpiece, a small hole, preferably the exact size of the bar 22, is drilled through the workpiece and the bar 22 is inserted therein. Next, the screw brad 15 on the drill is centered in the recess 24 in the bar 22 and the drill is rotated several revolutions so that the spur 28 on the drill will score the surface of the workpiece as is indicated at 29 in Fig. 1. The bar 22 is then withdrawn from the hole in the workpiece and inserted therein from the other side of the workpiece. The hub 20 of the spider 16 is then threaded onto the bar 22 until the side of the ring 17 contacts the workpiece and the end 23 of the bar 22 is approximately even with the other side of the workpiece. At this point it should be noted that a plurality of holes 30 are provided in the ring 17 so that nails or screws may extend therethrough into the workpiece preventing the spider 16 from rotating with respect to the workpiece. The screw brad 15 on the drill is then screwed into the recess 24 in the end of the bar 22. As the shank 11 of the drill is rotated, the connection between the drill and the bar 22, affected by the threading of the screw brad 15 into the recess 24, will cause the bar 22 to rotate. As the bar 22 rotates it will thread its way through the hub 20 of the spider 16 feeding the cutting edge of the drill into the workpiece. The bar 22 will guide the end of the drill through the workpiece and out its other side, and the drill will not jump damaging the walls of the hole because the screw brad 15 will remain securely within the recess 24 stabilizing the drill even after it leaves the workpiece. The portions 18 of the spider 16 must be of substantial length so that the cutting edges of the drill will not contact the spider as they emerge from the workpiece.

The alternative form of my invention illustrated in Fig. 5 functions exactly as does the form illustrated in the preceding figure except that the end of the rod 22 opposite the end 23 must always be inserted in the hole in the workpiece.

Fig. 6 illustrates an alternative form of spider employed in my invention, wherein the spider is formed as a cup-shaped stamping 31 having an outwardly extending flange 32 around the mouth of the cup-shaped member 31. Suitable holes are provided in the flange 32 similar to the holes 30 in Fig. 3 which permit the spider to be tacked to the workpiece through which a hole is being drilled. Centrally of the cup-shaped member 31 is provided an internal boss 33 through which is formed a threaded hole 34 adapted to receive the threaded bar which guides the drill.

It should be understood that while my invention has been described as operating by power supplied to the shank of the drill, it is equally operable when driven by power supplied to the end of the bar 22 remote from the tool 11. When such is the case, it is necessary that the thread of the screw brad be reversed from that illustrated in the forms of my invention illustrated in Figs. 1 through 4 in order that the screw brad will remain attached to the end 23 of the bar 22 while this hole is being drilled.

As an alternative form of my invention the recess 24 in the end 23 of the bar 22 may be so shaped as to exactly receive a non-circular brad on the end of the drill. In such a case the brad is merely forced into the recess 24. When this form of my invention is employed, it is necessary to bear axially against the shank 11 of the drill while the hole is being drilled in order that the brad on the drill will not slip out of the recess 24.

Other modes of applying the principle of the invention may be employed, change being made as regards the details described, provided the features stated in any of the following claims or the equivalent of such be employed.

I, therefore, particularly point out and distinctly claim as my invention:

1. A drill guiding and feeding means comprising in combination a cup-shaped member provided with a peripheral portion having a work engaging face and a central portion spaced from the plane of said work engaging face, said central portion provided with a threaded aperture therethrough the axis of which is at right angles to said plane, and a drill pilot and lead bar comprising a substantially cylindrical body threaded throughout a portion of its length and in such portion adapted to be embraced in said threaded aperture.

2. A drill guiding and feeding means comprising in combination a spider member provided with a peripheral portion having a work engaging face and a substantially central hub spaced from the plane of said work engaging face, said hub provided with a threaded aperture therethrough the axis of which is at right angles to said plane, and a pilot and lead bar comprising a substantially cylindrical body threaded throughout a portion of its length and in such portion adapted to be embraced in the threaded aperture in said hub, the end of said body provided with a recess adapted to receive and secure against one direction of rotation the brad of the drill.

3. A drill guiding and feeding means comprising in combination a spider member provided with a peripheral portion having a work engaging face and a substantially central hub spaced from the plane of said work engaging face, said hub provided with a threaded aperture therethrough the axis of which is at right angles to said plane, and a pilot and lead bar comprising a substantially cylindrical body threaded throughout a portion of its length and in such portion adapted to be embraced in the threaded aperture in said hub, the end of said body provided with a conical recess therein the walls of which are made of a soft metal.

4. A drill guiding and feeding means comprising in combination a spider member provided with a peripheral portion having a work engaging face and a substantially central hub spaced from the plane of said work engaging face, said hub provided with a threaded aperture therethrough the axis of which is at right angles to said plane, and a pilot and lead bar comprising a substantially cylindrical body threaded throughout a portion of its length and in such portion adapted to be embraced in the threaded aperture in said hub, the end of said body provided with a recess therein the walls of which are provided with threads complimentary to the threads on a screw brad of the drill.

5. A drill guiding and feeding means comprising in combination a spider member provided with a peripheral portion having a work engaging face and a substantially central hub spaced from the plane of said work engaging face, said hub provided with a threaded aperture therethrough the axis of which is at right angles to said plane, and a pilot and lead bar comprising a substantially cylindrical body threaded throughout a portion of its length and in such portion adapted to be embraced in the threaded aperture in said hub, the end of said body provided with a cylindrical recess therein and a cylindrical piece of a soft metal securely mounted in said recess, the external end of said piece being provided with a conical recess therein.

6. A drill guiding and feeding means comprising in combination a spider member provided with a peripheral portion having a work engaging face and a substantially central hub spaced from the plane of said work engaging face, said hub provided with a threaded aperture therethrough the axis of which is at right angles to said plane, and a pilot and lead bar comprising a substantially cylindrical body threaded throughout a portion of its length and in such portion adapted to be embraced in the threaded aperture in said hub, the end of said body provided with a recess therein the shape of which conforms to the shape of a non-cylindrical brad on the drill.

7. A drill guiding and feeding means comprising in combination a spider member provided with a peripheral portion having a work engaging face and a substantially central hub spaced from the plane of said work engaging face, said hub provided with a threaded aperture therethrough the axis of which is at right angles to said plane, and a pilot and lead bar comprising a substantially cylindrical body threaded throughout a portion of its length and in such portion adapted to be embraced in the threaded aperture in said hub, the end of said body being rigidly secured to the body of the drill.

No references cited.